May 3, 1966   H. R. KINSELLA, JR   3,249,740
WATER HEATER AND CONTROL THEREFOR
Filed May 4, 1964
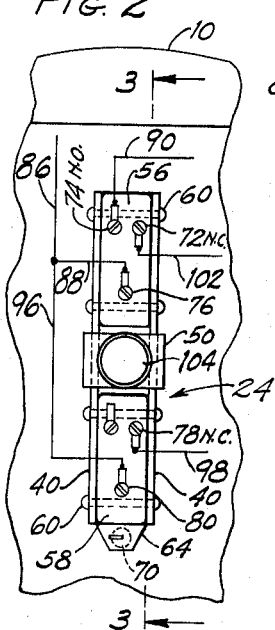
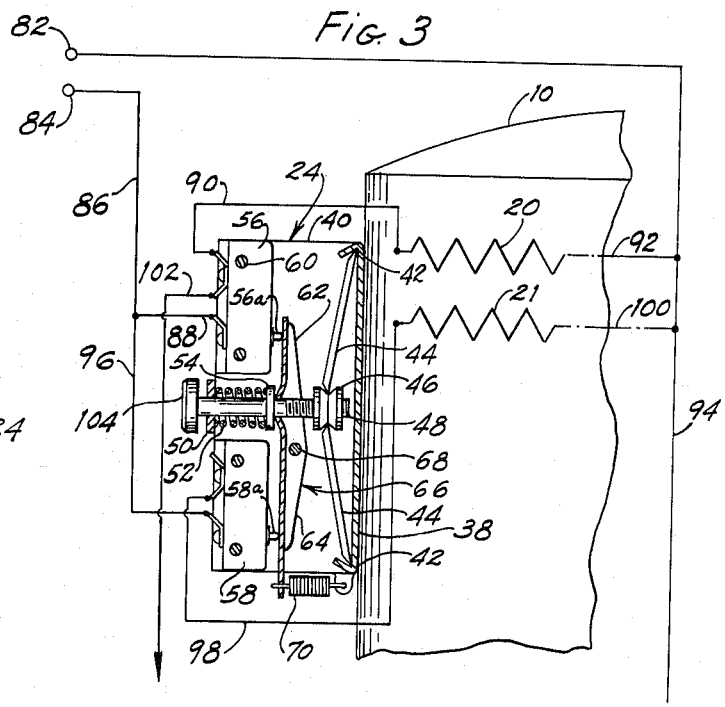
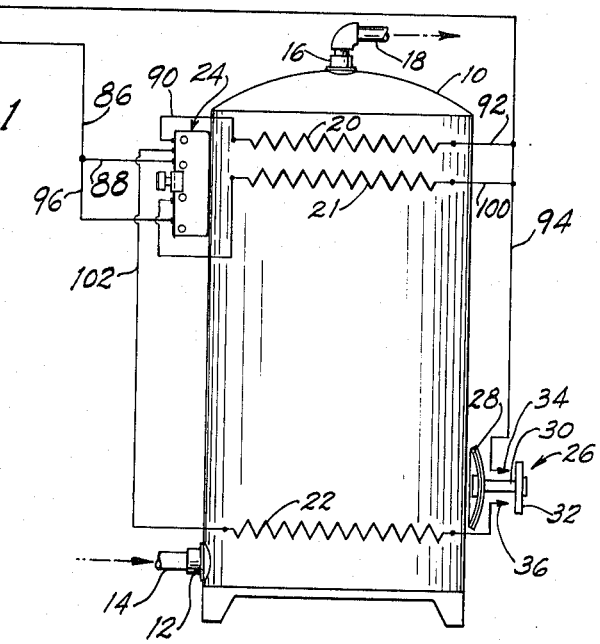
INVENTOR
HOWARD R. KINSELLA JR.
BY Charles E. Markham
HIS AGENT 3,249,740
WATER HEATER AND CONTROL THEREFOR
Howard R. Kinsella, Jr., Affton, Mo., assignor to Emerson Electric Co., a corporation of Missouri
Filed May 4, 1964, Ser. No. 364,637
1 Claim. (Cl. 219—321)

This invention relates to domestic water heaters having electrical resistance heating means, and particularly to an arrangement wherein automatic control means operates the resistance heating means within a predetermined electrical load limit under conditions of normal hot water usage but permits operation at a somewhat higher electrical load to partially restore the preselected water temperature when an abnormal drawoff of hot water occurs. The present invention is an improvement of the arrangement set forth in my earlier application, Serial No. 225,606, filed September 24, 1962, now Patent No. 3,162,752, issued December 22, 1964.

Being confronted with wide variations in electrical load, with outstanding peak periods, many suppliers of electrical power have imposed limitations on power use in connection with domestic water heaters. While such limitations may cause no appreciable inconvenience under conditions of normal water usage, an objectionable delay in replenishing the hot water supply may result when the occasional large drawoff of hot water occurs. Based on the proposition that the occasional large drawoff is a relatively infrequent, random occurrence not likely to appreciably increase the usual periodic peak loads of the power supplier, I have provided an electric water heater including automatic control means whereby the electrical load is temporarily increased above the usual power supply limitation for a period sufficient to partially restore the preselected water temperature under conditions wherein the water temperature drops to a point considerably lower than that which would occur from the usual drawoff.

It is an object of the invention to provide an electrically heated hot water tank and control means therefor which normally limits operation of the electrical heating means to a predetermined electrical load to restore the preselected water temperature under conditions of usual drawoff of hot water, but operates the electric heating means at a higher electrical load to partially restore the preselected water temperature when an unusually large drawoff of hot water occurs.

Other objects and advantages will appear from the following description when read in connection with the accompanying drawing.

In the drawing:

FIG. 1 schematically illustrates a domestic water heater with associated electrical heating elements and controls therefor constructed in accordance with the present invention;

FIG. 2 is an enlarged front elevational view of the upper thermostatic switching device; and FIG. 3 is a view of the upper thermostatic switching device taken along line 3—3 of FIG. 2.

Referring to the drawing, numeral 10 indicates a vertically arranged water tank having a lower fitting 12 in which a cold water line 14 is connected and an upper fitting 16 to which a hot water line 18 is connected. The tank is provided with an upper electrical resistance heater 20, an intermediate electrical resistance heater 21, and a lower resistance heater 22. Heaters 20, 21, and 22 may be of any suitable type and construction and preferably encircle the tank in heat conductive relationship therewith. Resistance heater 21 may be placed at any desired position, preferably it is positioned so as to heat water in the upper portion of the tank in which position its operation time will be considerably less than when placed in the lower portion of the tank.

Positioned near the upper end of the tank 10 is a primary thermostatic switching device generally indicated at 24 and positioned near the lower end of the tank is a secondary thermostatic switching device generally indicated at 26. Lower thermostatic switching device 26 consists of a bimetal disc 28 in good heat conductive relationship with the lower portion of the tank. The disc 28 has a hot position, as shown in FIG. 1, in which it is outwardly convex and a cold position in which it is outwardly concave, the latter position being assumed in response to a predetermined decrease in temperature. The action of the disc 28 from one position to the other is a snap action. Thermostatic switching device 26 further includes an actuating rod 30 operatively associated at one end with the center portion of disc 28 and carrying at its other end a switch blade 32. Switch blade 32 cooperates with a pair of stationary contacts 34 and 36.

Referring to FIGS. 2 and 3 of the drawing, the primary thermostatic switching device 24 comprises a channel-form frame having a base 38 and perpendicular sides 40. Switching device 24 is suitably mounted on the upper part of tank 10 with the base 38 in contact with the tank or at least in good heat transfer relationship therewith. The base 38 is slightly longer than the sides 40 and the ends of the base are formed inward at an acute angle, as indicated at 42, to receive and retain the knife-edged outer ends of a pair of rigid arms 44. The inner ends of the arms 44 are also knifed-edged and are received in an annular V-groove formed in an internally threaded collar 46 which is threadedly engaged on the inner threaded end of a slidably mounted rod 48. Rod 48 is slidably guided at its outer end in an aperture in a strap 50 which spans the open end of the channel frame at its center and is rigidly attached thereto.

The channel frame is formed from sheet aluminum or of other metal having a high coefficient of thermal expansion, while the rigid arms 44 are constructed of a metal having a low coefficient of expansion, such as Invar. Longitudinal expansion and contraction of the channel frame due to temperature change causes rotational movement of arms 44 about their outer ends which, in turn, effects axial movement of the slidable rod 48. The rod 48 is biased inward toward the right, with respect to FIG. 3, by a compression spring 52 bearing at one end against strap 50 and at its other end against a collar 54 fixed intermediately on slidable rod 48.

Mounted between frame sides 40 on opposite sides of slidable rod 48 is a pair of miniature snap switches 56 and 58. Snap switches 56 and 58 are attached to the frame by rivets 60. These switches are of the double-throw, spring-return type, each having a switch blade carrying a movable contact and a pair of opposed fixed contacts with terminals, one of which fixed contacts is in normally closed engagement with the movable contact and the other open. This type of switch is more fully shown and described in the United States Patent No. 2,701,475, issued to Robert M. Readeker. The switches 56 and 58 are provided with operating pins 56a and 58a, respectively, which pins are in turn engaged, respectively, by the legs 62 and 64 of an intermediately pivoted lever 66. Lever 66 is pivotally mounted on a pin 68 supported in the frame sides 40, and a tension spring 70 connected to the fre end of the leg 64 of lever 66 and to the frame biases lever 66 in a counterclockwise direction with the lever leg 62 bearing against the collar 54 on axially slidable rod 48.

Referring to FIG. 2, miniature snap switch 56 has a normally closed contact and terminal therefor designated 72 N.C., a normally open contact and terminal therefor designated 74 N.O., and a switch blade and terminal therefor designated 76. Miniature snap switch 58 has a normally closed contact and terminal therefor designated 78 N.C. and a switch blade and terminal therefor designated 80, the other fixed contact of switch 58 being idle in this arrangement.

Under conditions in which the temperature of the water in the upper portion of the tank is that which has been selected to be maintained, the base 38 of the frame will be in such expanded condition as to permit stronger compression spring 52 to bias the lever 66 sufficiently in a clockwise direction against weaker tension spring 70 to allow switch operating pin 56a of switch 56 to return to its free extended position, wherein contact 72 N.C. and contact 74 N.O. of switch 56 will be in their normally closed and normally open positions, respectively, as indicated in FIG. 2. The normally closed contact 78 N.C. of switch 58 will not, however, be in its normally closed position under these conditions, but will be in an open position by reason of the depression of its operating pin 58a by the lever arm 64.

As frame base 38 contracts due to decreasing temperature, slidable rod 48 will be forced outward, compressing spring 52 and permitting spring 70 to rotate lever 66 counterclockwise about pivot 68. When the lever 66 is caused to rotate counterclockwise, switch 56 will be actuated first to a position in which its contact 74 N.O. is closed and its contact 72 N.C. is open and thereafter, as lever 66 is caused to rotate further in a counterclockwise direction due to a further decrease in temperature, switch 58 will be actuated from the position in which its contact 78 N.C. was held open by lever arm 64 to its normally closed position.

Upon an increase in temperature, causing the clockwise rotation of lever 66, the reverse sequence of switch actuation occurs, that is; the normally closed contact 78 N.C. of switch 58 is caused to open first and thereafter, upon further increase in temperature, contacts 72 N.C. and 74 N.O. of switch 56 are permitted to return to their normally closed and normally open positions respectively. The lever arm length between pivot 68 and operating pin 56a of switch 56 is made somewhat greater than the arm length from pivot 68 to operating pin 58a of switch 58 in order to effect this sequential operation of the switches Circuit connections extending through primary and secondary thermostatic switching devices 24 and 26 and connecting resistance heating elements 20, 21, and 22 with power source terminals 82 and 84 will now be described. Upper resistance heater 20 is connected across power source terminals 82 and 84 through a lead 86, a lead 88 to switch blade terminal 76, through the switch blade of switch 56 and the normally open contact 74 N.O. of switch 56 when it is closed, through a lead 90 to resistance heater 20, through heater 20, and through leads 92 and 94 to power source terminal 82.

Intermediate resistance heater 21 is connected across power source terminals 82 and 84 through lead 86, a lead 96 to switch blade terminal 80, through the normally closed contact 78 N.C. when it is closed, through a lead 98 to resistance heater 21, through heater 21 and leads 100 and 94 to power source terminal 82.

Lower resistance heater 22 is connected across power source terminals 82 and 84 through lead 86, lead 88 to switch blade terminal 76, through the switch blade and normally closed contact 72 N.C. of switch 56 when it is closed, through a lead 102 to lower heater 22, through heater 22 through contact 36, switch blade 32 and contact 34 of secondary thermostatic switching device 26, and through lead 94 to power source terminal 82.

*In operation*

Assuming the temperature of the water throughout the tank is that which has been preselected, the lower secondary thermostatic switching device 26 will be open as shown and upper primary thermostatic switching device will be in a satisfied condition with normally closed contact 72 N.C. of switch 56 in its normally closed position and normally open contact 74 N.O. in its normally open position. Also, the normally closed contact 78 N.C. of switch 58 will be held open under these conditions.

When under these conditions water is drawn off from the upper part of the tank through hot water line 18, cold water enters the lower portion of the tank through cold water line 14 and lower secondary thermostat 26 will be close first, thereby completing a circuit for lower heater 22 through the normally closed contact 72 N.C. of switch 56 of upper primary thermostatic switching device 24 and through lower secondary thermostatic switching device 26. If the amount of hot water drawn off is insufficient to lower the water temperature in the upper part of the tank so as to effect any response of the upper thermostatic switching device 24, the operation of lower heater 22 will continue alone until lower thermostat 26 again opens.

If, however, the drawoff is great enough to appreciably lower the temperature in the upper portion of the tank, contraction of frame base 38 of upper thermostatic switching device will occur, causing a counterclockwise rotation of its lever 62 and the actuation of its switch 56 to a position in which normally open contact 74 N.O. will be closed and normally closed contact 72 N.C. will be opened. This action will effect the completion of a circuit for upper heater 20 through the now closed contact 74 N.O. of switch 56 and will break the circuit for lower heater 22 which was completed through contact 72 N.C. of switch 56. Under these conditions upper heater 20 will operate alone until the water temperature in the upper portion of the tank is restored and thermostat 24 is satisfied; thereafter, lower heater 22 will again operate until lower thermostat 26 is satisfied.

Under conditions wherein the drawoff is unusually great, contraction of the frame base 38 will be sufficient to sequentially actuate both switches 56 and 58. When this occurs upper heater 20 and intermediate heater 21 will be operated concurrently, and lower heater 22 will be inoperative. The actuation of switch 58 will be effected under these conditions by the sufficient further movement of lever 64 away from switch operating pin 58a to permit the normally closed contact 78 N.C. to assume its free normally closed position.

The vertical position of heater 21 on the tank may be varied; it may be positioned above or below heating element 20 and either closely adjacent thereto or it may be positioned somewhat lower near the central portion of the tank. The ratio of the diameter of the tank to its height and the length of time for which it is desirable or permissible to exceed the normal predetermined electrical load will be factors in determining the location of heater 21. Obviously, everything else being constant, the lower the heater 21 is positioned the longer it will be in operation. The position of the primary thermostatic switching device, which controls operation of heating element 21, is such, however, as to be responsive to the temperature of the water in the upper portion of the tank.

The slidable rod 48 of the upper primary thermostatic switching device 24 is provided with a knob 104. Rotation of knob 104 changes the relationship of the annular groove in threaded collar 46 and the fixed collar 54 and thereby provides means for varying the temperature setting of the device 24.

I claim:

A water heater comprising a tank having a cold water inlet in the lower portion thereof and a hot water outlet in the upper portion thereof, a source of electrical power, upper, lower, and intermediate electrical resistance heaters operative when energized to heat water in upper, lower, and intermediate portions, respectively, of said tank, an upper unity thermostatic device comprising a double throw switch having first and second throw positions, a single throw switch having open and closed positions and a thermostatic actuator comprising a single thermostatic element and means operatively connecting said single element to both of said switches and operative to sequentially move said double throw switch from its first to second throw position and then move said single throw switch from its open to closed position in response to decreasing temperature and, conversely, to sequentially open said single throw switch and then move said double throw switch from its second to first throw position in response to increasing temperature, a lower thermostatic device comprising a single throw switch having open and closed positions and a thermostatic actuator operatively connected thereto and operative to close said single throw switch in response to decreasing temperature, said upper and lower thermostatic devices being positioned to respond to water temperature changes in the upper and lower portions, respectively, of said tank, circuit connections completed through said double throw switch of said upper thermostatic device when in its first position and through said single throw switch of said lower thermostatic device when in a closed position connecting said lower electrical resistance heater across said power source, circuit connections completed through said double throw switch of said upper thermostatic device when in its second position connecting said upper resistance heater across said power source, and circuit connections completed through said single throw switch of said upper thermostatic device when in a closed position connecting said intermediate heater across said power source, and said upper, lower, and intermediate heaters being connected in parallel relationship across said power source.

References Cited by the Examiner
UNITED STATES PATENTS

| | | | |
|---|---|---|---|
| 2,157,910 | 5/1939 | McCormick | 219—321 X |
| 2,377,440 | 6/1945 | Ostherheld | 219—321 X |
| 2,380,545 | 7/1945 | Pankow | 219—321 |
| 3,162,752 | 12/1964 | Kinsella | 219—330 X |

RICHARD M. WOOD, *Primary Examiner.*

ANTHONY BARTIS, *Examiner.*